US012320155B2

(12) United States Patent
Jensen et al.

(10) Patent No.: US 12,320,155 B2
(45) Date of Patent: Jun. 3, 2025

(54) LOCKING DEVICE FOR MECHANICAL AND NON-MECHANICAL ACTIVATION OF A LOCKING BOLT

(71) Applicant: STENDALS EL AB, Västerås (SE)

(72) Inventors: Lars Jensen, Surahammar (SE); Olov Stendal, Västerås (SE)

(73) Assignee: STENDALS EL AB, Västerås (SE)

( * ) Notice: Subject to any disclaimer, the term of this patent is extended or adjusted under 35 U.S.C. 154(b) by 132 days.

(21) Appl. No.: 18/036,255

(22) PCT Filed: Nov. 9, 2021

(86) PCT No.: PCT/SE2021/051119
§ 371 (c)(1),
(2) Date: May 10, 2023

(87) PCT Pub. No.: WO2022/103315
PCT Pub. Date: May 19, 2022

(65) Prior Publication Data
US 2024/0011325 A1 Jan. 11, 2024

(30) Foreign Application Priority Data
Nov. 12, 2020 (SE) .................................... 2051322-2

(51) Int. Cl.
*E05B 47/00* (2006.01)

(52) U.S. Cl.
CPC .. *E05B 47/0012* (2013.01); *E05B 2047/0017* (2013.01); *E05B 2047/002* (2013.01); *E05B 2047/0084* (2013.01)

(58) Field of Classification Search
CPC .... E05B 47/00; E05B 47/0012; E05B 47/023; E05B 63/0013; E05B 15/004;
(Continued)

(56) References Cited

U.S. PATENT DOCUMENTS 4,685,709 A * 8/1987 Kambic .............. E05B 47/0012 292/201
4,913,475 A 4/1990 Bushnell et al.
(Continued)

FOREIGN PATENT DOCUMENTS

EP 0482588 A1 4/1992
EP 1213425 A1 6/2002
(Continued)

*Primary Examiner* — Suzanne L Barrett
(74) *Attorney, Agent, or Firm* — Dilworth & Barrese, LLP.

(57) ABSTRACT

The present invention relates to a locking device comprising—a locking bolt (12), —follower arrangement (30) comprising a follower arm (32) and a follower (31) for mechanical activation of the locking device (12), —a non-mechanical activation unit (A) connected to a rod arrangement (40) wherein the locking device (10) comprises a coupler (50) for coupling a movement of the rod arrangement (40) in a first direction (D) to the follower arrangement (30) and causing a corresponding rotation of the follower arm (32), and wherein the locking device (10) further comprises a play (P) configured to allow rotation of the follower arm (32) caused by mechanical activation without causing a corresponding movement of the first rod (41) of the rod arrangement (40).

20 Claims, 15 Drawing Sheets

Figure 1:
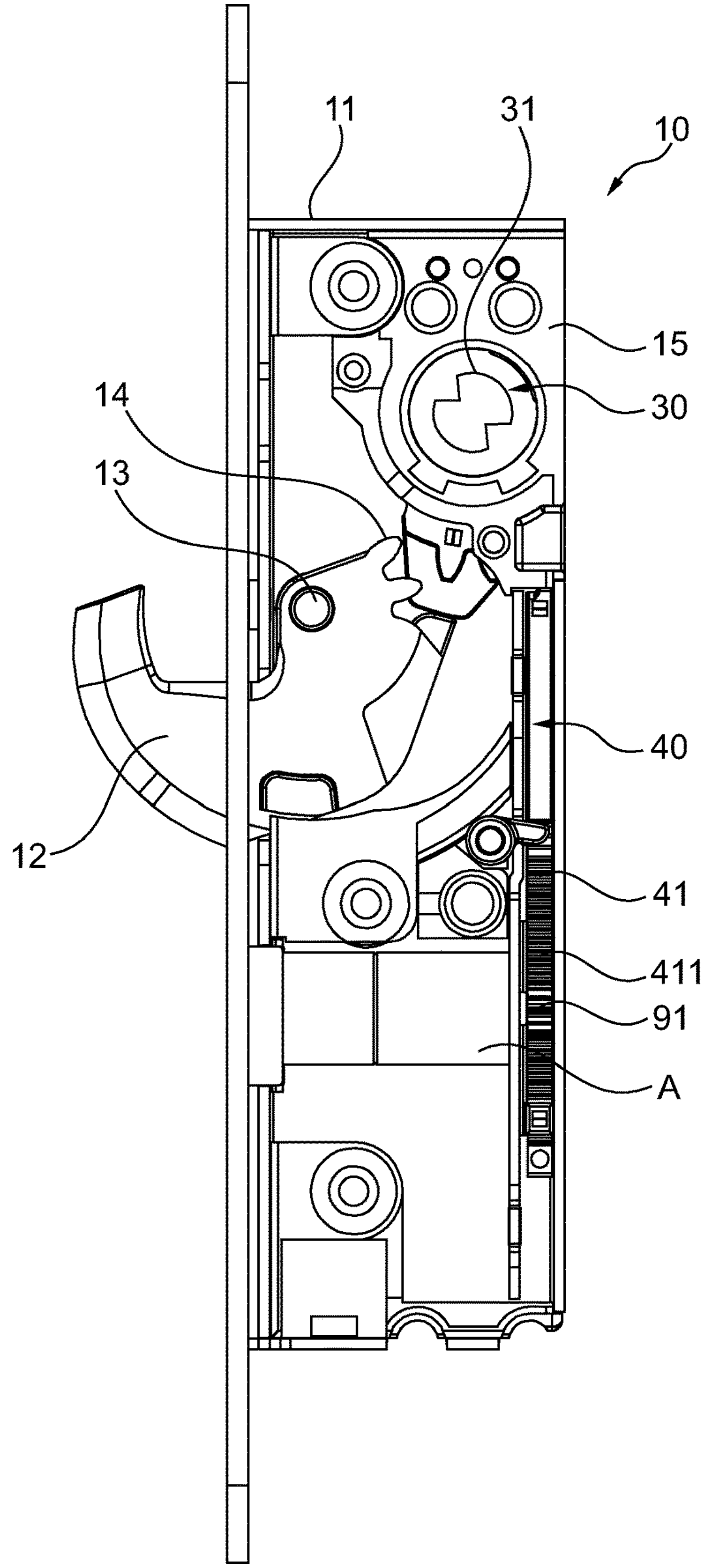

(58) Field of Classification Search
CPC ............... E05B 55/00; E05B 2047/002; E05B 2047/0024; E05B 2047/0069; E05B 2047/0084; E05B 2047/0094; E05B 2047/0017; Y10T 70/7107
USPC ......................................................... 70/279.1
See application file for complete search history.

(56) References Cited

U.S. PATENT DOCUMENTS

| | | | | |
|---|---|---|---|---|
| 5,148,691 | A * | 9/1992 | Wallden | E05B 47/0012 292/201 |
| 2009/0277231 | A1 * | 11/2009 | Kim | E05B 63/0013 70/336 |
| 2012/0000257 | A1 * | 1/2012 | Wheeler | E05B 63/0056 70/91 |
| 2012/0292925 | A1 | 11/2012 | Lundberg et al. | |
| 2019/0032368 | A1 | 1/2019 | Welbig et al. | |

FOREIGN PATENT DOCUMENTS

| | | | |
|---|---|---|---|
| EP | 2169156 | A1 | 3/2010 |
| FR | 2821381 | A1 | 8/2002 |
| SE | 463979 | B | 2/1991 |
| WO | 2005/054610 | A1 | 6/2005 |

* cited by examiner

LOCKING DEVICE FOR MECHANICAL AND NON-MECHANICAL ACTIVATION OF A LOCKING BOLT

TECHNICAL FIELD

The present invention relates to a locking device for mechanical and non-mechanical activation of a locking bolt and that prevents the non-mechanical activation from being affected by the mechanical activation.

BACKGROUND

Within the field of locking devices, there is generally a need for achieving multiple functions in a severely limited space. Often, it is desirable to be able to operate the locking device in a purely mechanical way using a key that is inserted and rotated. It is also desirable to have an alternative, non-mechanical activation such as an electrical motor or a solenoid that control locking and unlocking of the locking device, and it is a common problem to find a solution for combining the mechanical and the non-mechanical activation in the same device. Is it a particular problem to protect the non-mechanical activation from being damaged when mechanical operation of the locking device takes place.

Thus, there is a general need for a robust and efficient locking device that is able to provide mechanical and non-mechanical activation that operate without adversely affecting each other. More particularly, there is a need for providing these functions in locking devices where the available space is even smaller than in locking devices in general. One such area is in narrow profile locks where no satisfactory solutions exist for providing these functions. Narrow profile locks are a category of locks that have a backset of 35 mm or less.

There is therefore a need for improvements within the field of locking devices.

SUMMARY

The object of the present invention is to eliminate or at least to minimize the problems discussed above. This is achieved by a locking device according to the description herein.

The locking device according to the present invention comprises a locking bolt having an extended position corresponding to a locked state and a retracted position corresponding to an unlocked state, and a follower arrangement comprising a follower arm that is arranged to rotate about a first axis, the follower arm being operatively connected to the locking bolt for moving the locking bolt in response to a rotation of the follower arm. Further, the follower arrangement comprises a follower that is configured to rotate about the first axis in response to a mechanical activation of the locking device, wherein the follower is further operatively connected to the follower arm such that a rotation of the follower also causes the rotation of the follower arm. Also, the locking device comprises a non-mechanical activation unit connected to a rod arrangement, said rod arrangement being configured to move in a first direction in response to an activation of the non-mechanical activation unit, said non-mechanical activation unit being connected to a first rod of the rod arrangement such that activation of the non-mechanical activation unit causes linear movement of the first rod. Furthermore, the locking device comprises a coupler for coupling the movement of the rod arrangement in the first direction to the follower arrangement and causing a corresponding rotation of the follower arm. Furthermore, the locking device comprises a play configured to allow rotation of the follower arm caused by mechanical activation without causing a corresponding movement of the first rod of the rod arrangement. The play is formed by a clearance in the locking device. In this way, a component connected to the follower arm is able to move without that movement being transferred to the first rod or a component connected to the first rod.

The locking device has the main benefits of being able to accommodate a mechanical activation and a non-mechanical activation that act on the same follower arrangement so that a very compact and space efficient locking device is achieved. Also, the play protects the non-mechanical activation unit from being damaged by repeatedly being forced to move due to the mechanical activation. This ensures a stable and reliable operation of the non-mechanical activation unit and prolongs the lifetime of the components.

It is also particularly advantageous that the mechanical activation and the follower arrangement use only one pivot so that the compact design of the locking device is realized. The second rod cooperates with the follower arrangement to convert a linear movement arising from activation of the non-mechanical activation unit into a rotation of the follower arm so that intermediate components are avoided.

Suitably, the coupler comprises a second coupling portion and the rod arrangement comprises a matching first coupling portion that is configured to engage with the second coupling portion such that a movement of one of the rod arrangement and the coupler is coupled to the other. Thereby, movement may be transferred from the rod arrangement to the coupler and vice versa in a reliable way. In some embodiments, the second coupling portion and the first coupling portion may be geared sections that are configured to mesh and in some embodiments they may comprise at least one protrusion on one of the engagement portions fitting into at least one recess on the other. Other configurations are also possible as long as they are able to transfer motion in an efficient way.

Suitably, the play is provided in the coupler such that a movement of the rod arrangement in response to the non-mechanical activation is coupled to cause a rotation of the follower arm but that a rotation of the follower arm in response to the mechanical activation is not coupled to the rod arrangement. The direction of movement is in the drawings shown as a clockwise direction and it is a direction that causes a retraction of the locking bolt. Advantageously, by providing the play in the coupler the rod arrangement may be made more robust and the play may be protected in the coupler to increase the protection against unauthorized manipulation.

It is advantageous to provide the play between similar movements, i.e. between linear movements of between rotary movements since this decreases the risk of misalignment of the components.

Suitably, where the play is provided in the coupler the coupler comprises a coupling member that is arranged to rotate about the first axis, said coupling member having the second coupling portion for engaging with the rod arrangement so that movement of the rod arrangement in the first direction is coupled to the coupling member, and said coupling member also having a follower arrangement engagement portion for engaging with the follower arrangement and coupling a rotation of the coupling member to the follower arrangement. Thereby, the coupling member is configured to move together with the rod arrangement and the interaction of the follower arrangement engagement portion with the follower comprises the play so that the movement of the follower is not coupled to the rod arrangement when a mechanical activation takes place. Thus, the play is suitably provided in connection with the follower arrangement engagement portion such that the follower arrangement is able to rotate without causing a corresponding rotation of the coupling member.

Suitably, the first rod of the rod arrangement comprises the first coupling portion. Thereby, the connection between the non-mechanical activation unit A and the coupler is rendered more stable since the play is not in the rod arrangement. This is suitable for embodiments where the play is not provided in the rod arrangement.

In some embodiments, the play is provided in the rod arrangement such that a linear movement of the first rod in the first direction causes a corresponding linear movement of a second rod that is operatively connected to the coupler, but that a linear movement of the second rod in a second direction that is opposite to the first direction does not cause a corresponding linear movement of the first rod. Thereby, the operation of the rod arrangement is rendered efficient and robust.

Also, the rod arrangement may comprise a rod coupler having a first rotary member that is operatively connected to the first rod and configured to rotate in response to a linear movement of the first rod, the rod coupler further having a second rotary member that is operatively connected to the second rod and configured to rotate in response to a linear movement of the second rod, wherein the first rotary member and the second rotary member are arranged in connection with each other in such a way that a rotation of the first rotary member is transferred to the second rotary member but a rotation of the second rotary member is not transferred to the first rotary member. This is also a reliable and stable design of the play.

Suitably, the follower comprises a first engaging portion and the follower arm comprises a corresponding second engaging portion that are configured so that a rotation of the follower causes the first engaging portion to contact the second engaging portion and rotate the follower arm. Thereby, the follower is configured to operate the follower arm directly, causing the mechanical activation to be transferred directly into a movement of the follower arm.

In some embodiments, the locking device may further comprise a catch for preventing a rotation of the follower arm, said catch comprising a catch protrusion arranged on one of the rod arrangement and the follower arrangement and a catch receiver arranged on the other of the rod arrangement and the follower arrangement, wherein the catch protrusion is configured to block the catch receiver and prevent movement of the follower arm in relation to the rod arrangement. Thereby, undesired movement of the follower arm is efficiently prevented so that the risk of unauthorized manipulation of the locking device is decreased.

Suitably, the catch protrusion is configured to block the catch receiver when the rod arrangement is in an end position. Thereby, an activation of the locking device that causes movement of the locking bolt may end with the catch being engaged so that further movements of the locking bolt are prevented until a new activation occurs. Suitably, two blocking positions are provided at either end of a movement path of the rod arrangement so that the catch is able to block the follower arm both at the end of an activation to extend the locking bolt and at the end of an activation to retract the locking bolt. Thereby, the locking device may be held in both the locked state and the unlocked state and only be brought out of that state through an activation of the follower or the rod arrangement caused by the mechanical or the non-mechanical activation.

Suitably, the follower and the follower arm of the follower arrangement are fixedly connected to each other. Thereby, a permanent connection between the follower and the follower arm that suitably provides them as an integrated component ensures that movement of the follower arm follows automatically upon a rotation of the follower.

Many additional benefits and advantages of the present invention will be readily understood by the skilled person in view of the detailed description below.

DRAWINGS

Figure 2:
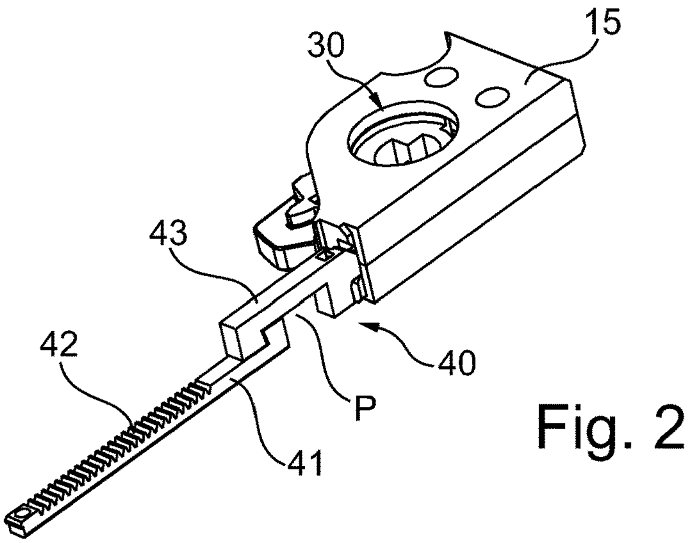
Figure 3A:
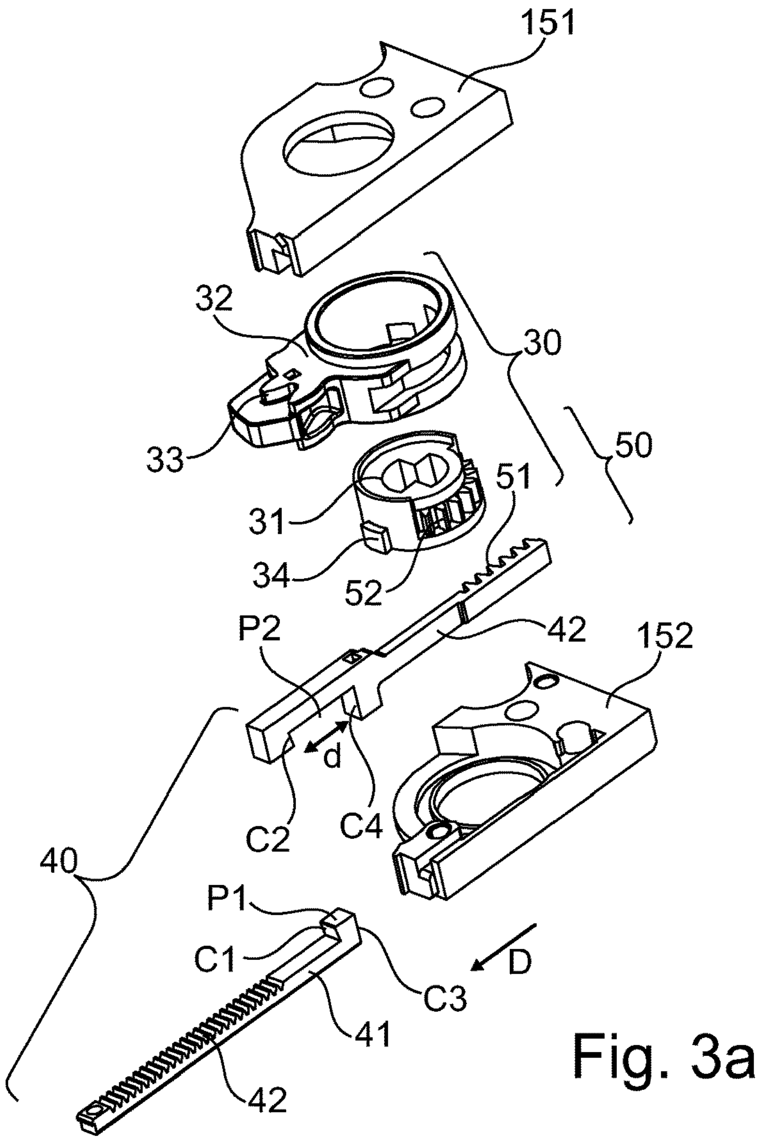
Figure 3B:
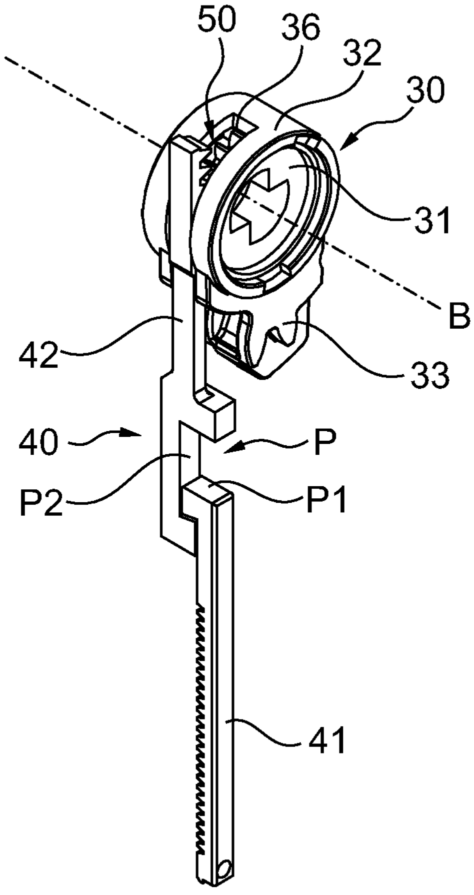
Figure 3C:
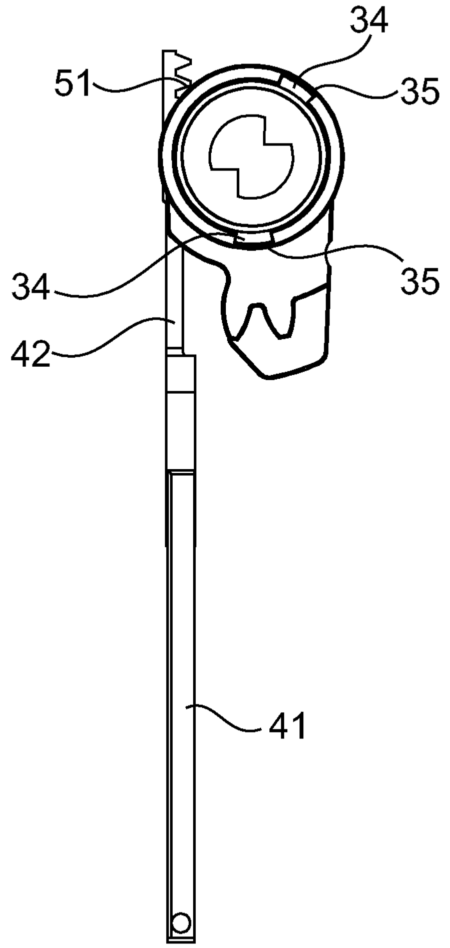
Figure 4B:
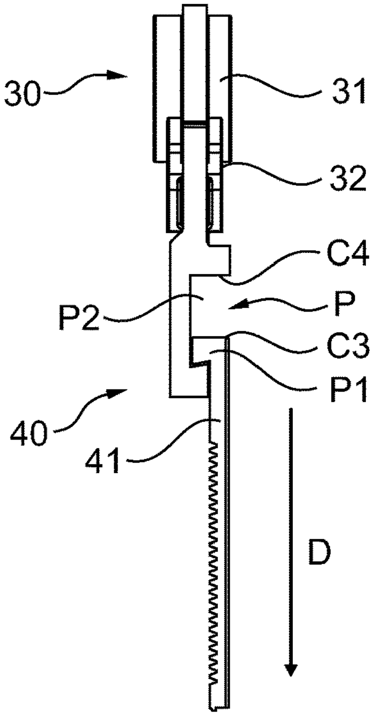
Figure 4A:
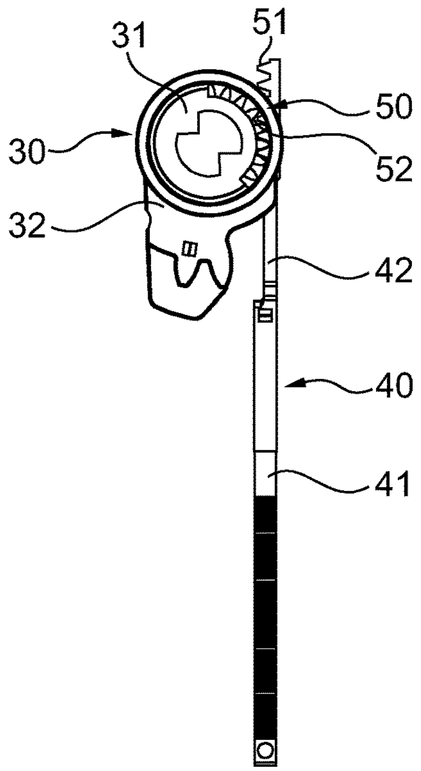
Figure 4D:
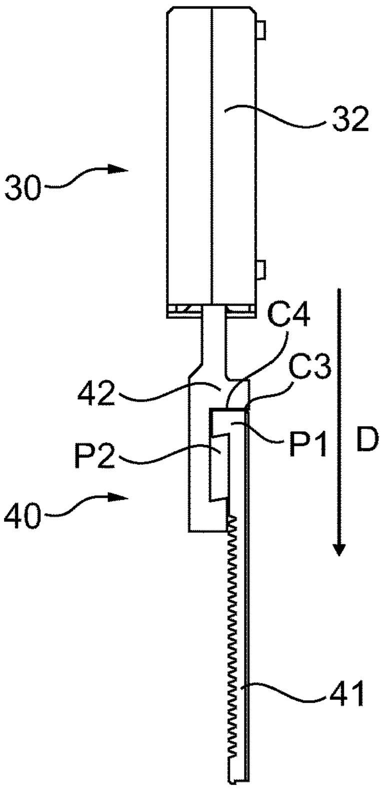
Figure 4C:
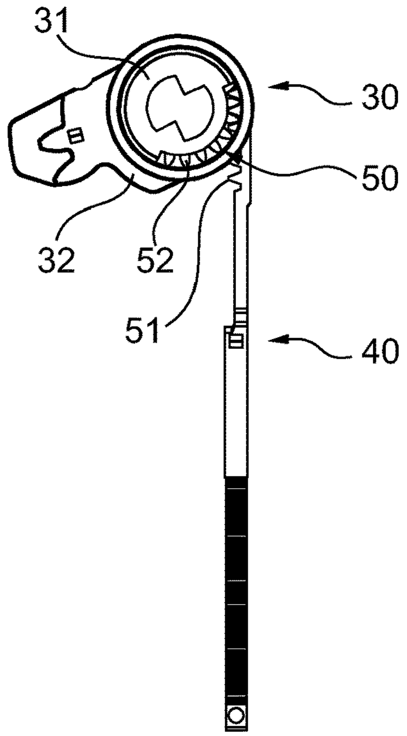
Figure 4F:
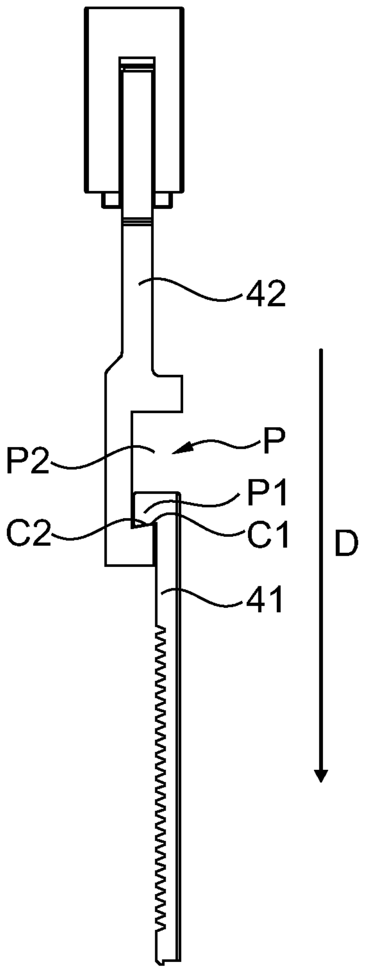
Figure 4E:
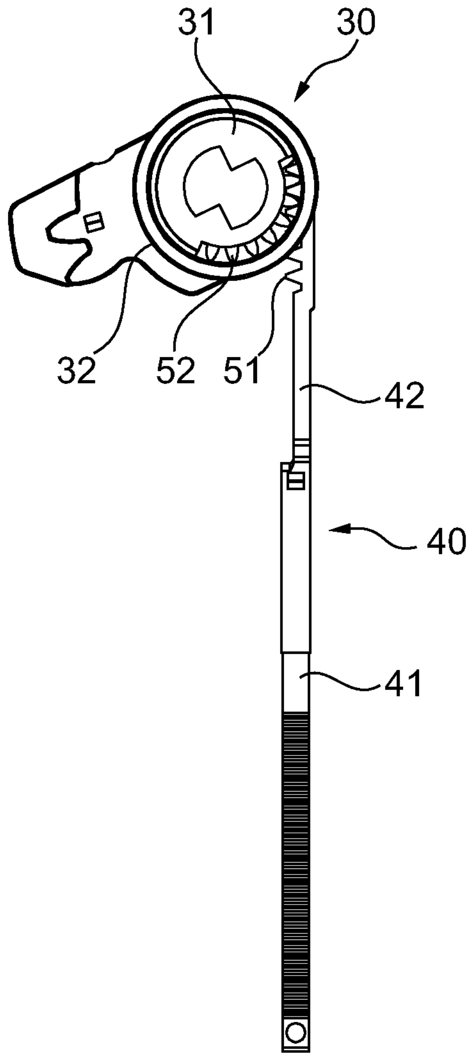
Figure 5A:
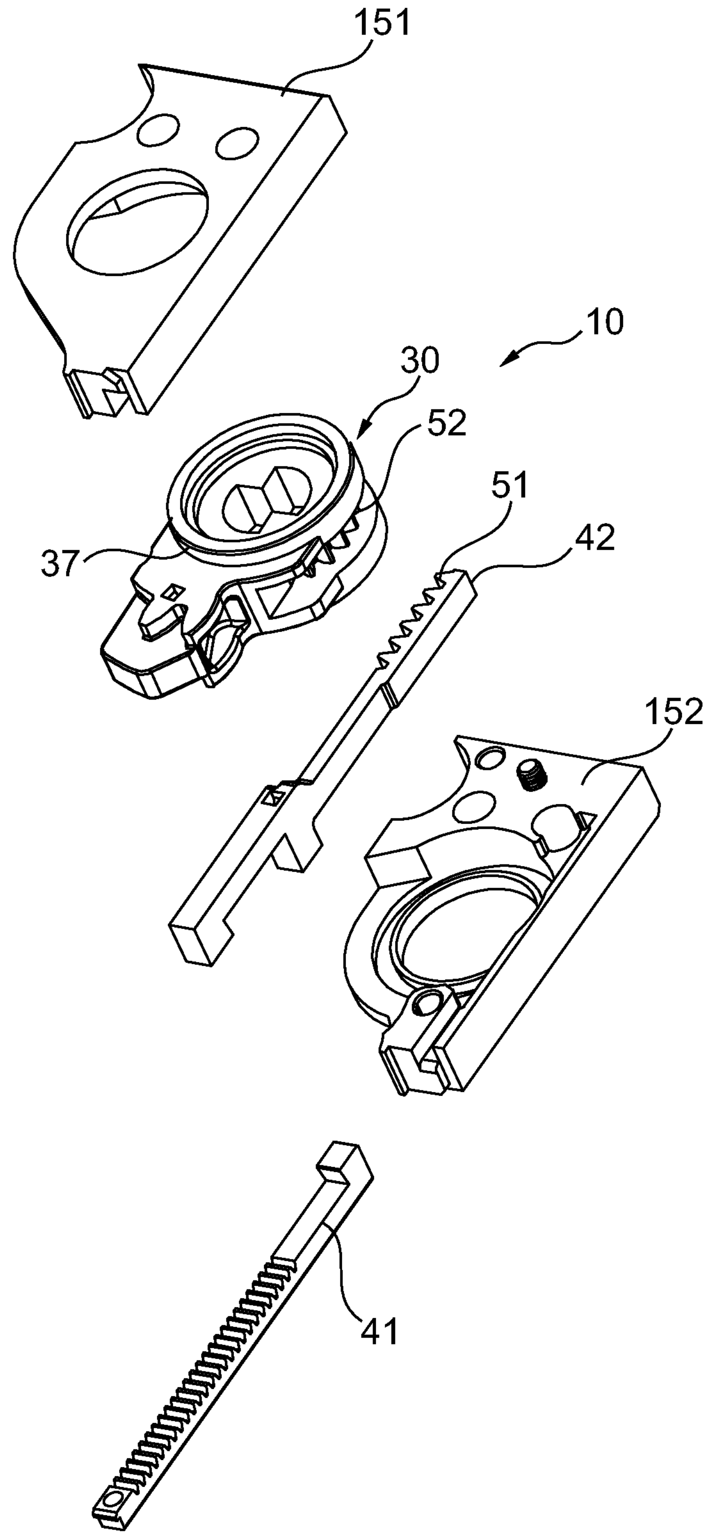
Figure 5B:
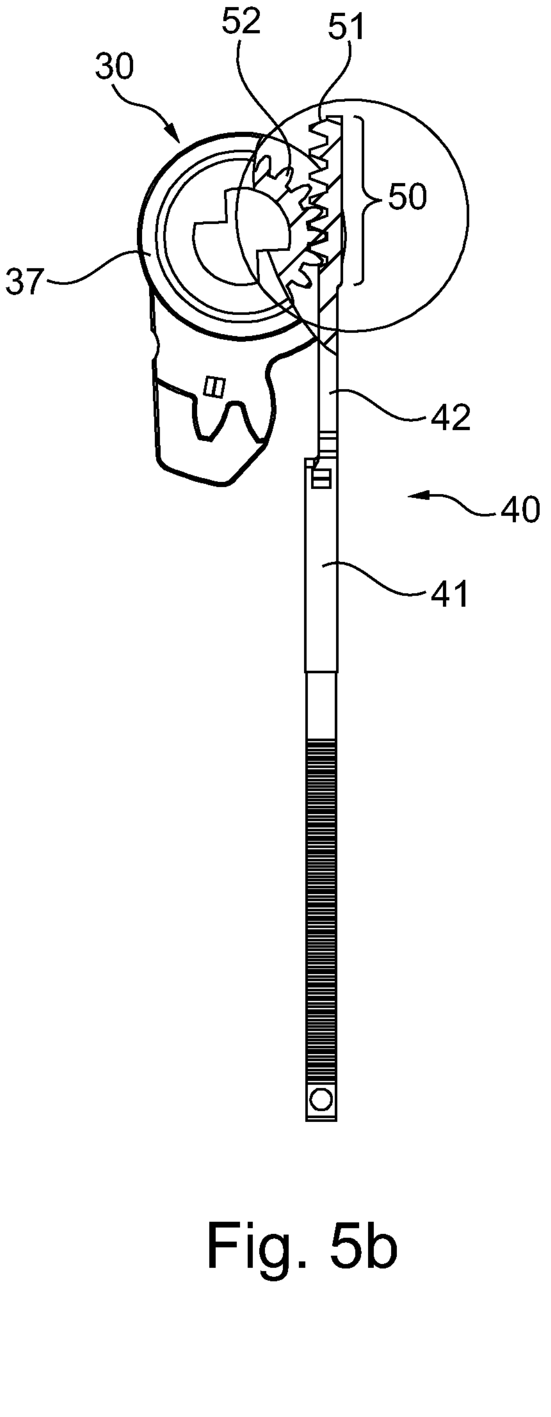
Figure 5C:
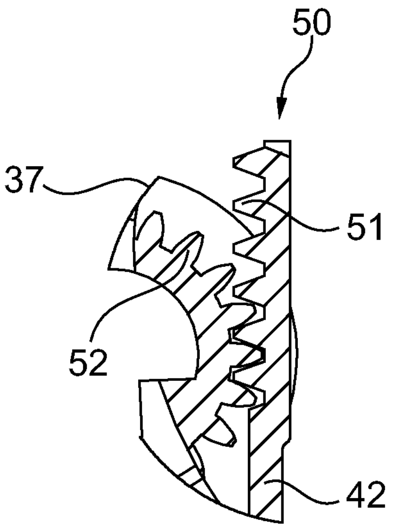

The invention will now be described in more detail with reference to the appended drawings, wherein FIG. 1 discloses a locking device according to the present invention;

FIG. 2 discloses a follower arrangement and rod arrangement of the locking device in an inner housing of the locking device;

FIG. 3*a* discloses an exploded view of a first embodiment of the locking device according to the invention;

FIG. 3*b* discloses a perspective view of the first embodiment in a mounted state;

FIG. 3*c* discloses a planar view of the first embodiment in the mounted state;

FIG. 4*a* discloses the follower arrangement and the rod arrangement of the first embodiment in a closed position with the rod arrangement in a rest position;

FIG. 4*b* discloses the components of FIG. 4*a* from the side;

FIG. 4*c* discloses the follower arrangement and the rod arrangement of the first embodiment in an open position with the rod arrangement in the rest position;

FIG. 4*d* discloses the components of FIG. 3*c* from the side;

FIG. 4*e* discloses the follower arrangement and the rod arrangement of the first embodiment in an open position with the rod arrangement activated;

FIG. 4*f* discloses the components of FIG. 4*e* from the side;

FIG. 5*a* discloses a second embodiment of the invention in an exploded view;

FIG. 5*b* discloses a planar view of the second embodiment in a mounted state and with a cross-sectional view of the coupler;

FIG. 5*c* discloses an enlarged cross-sectional view of the circle of FIG. 5*b;*

Figure 6A:
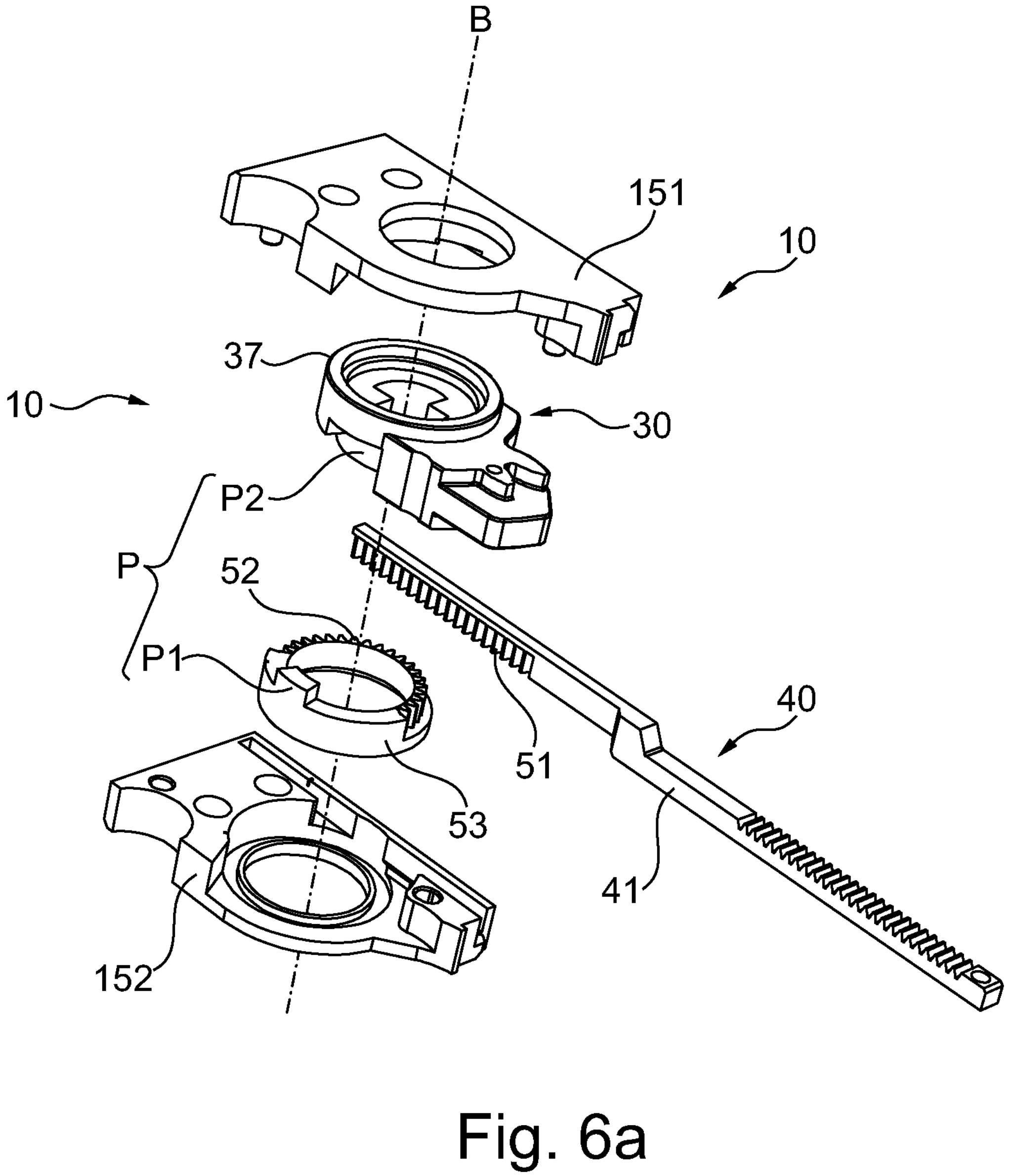
Figure 6B:
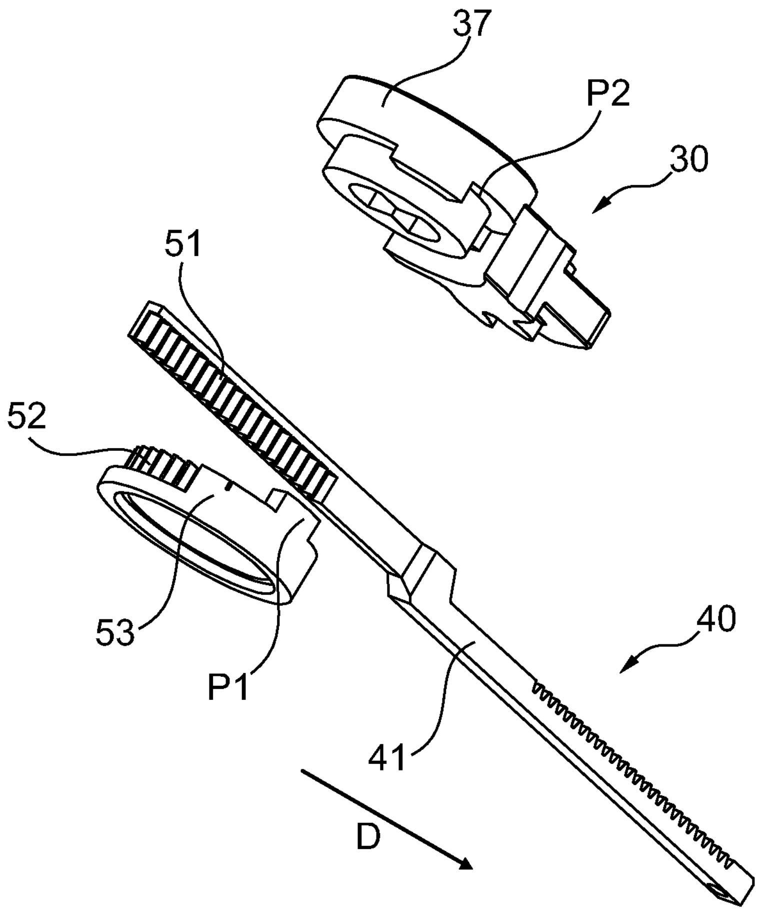
Figure 7A:
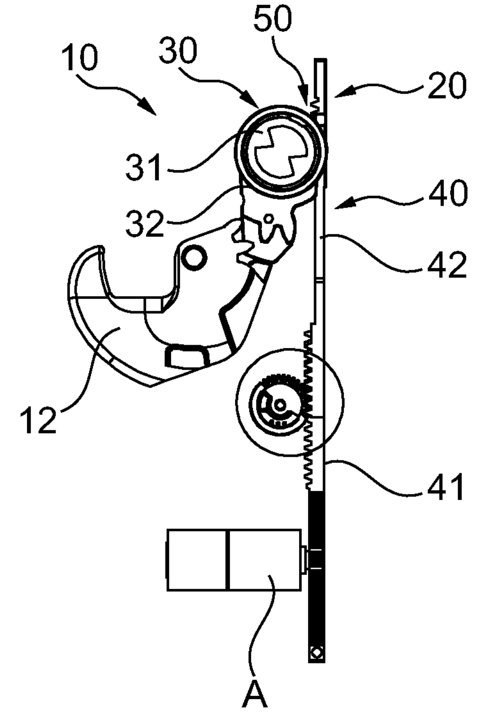
Figure 7B:
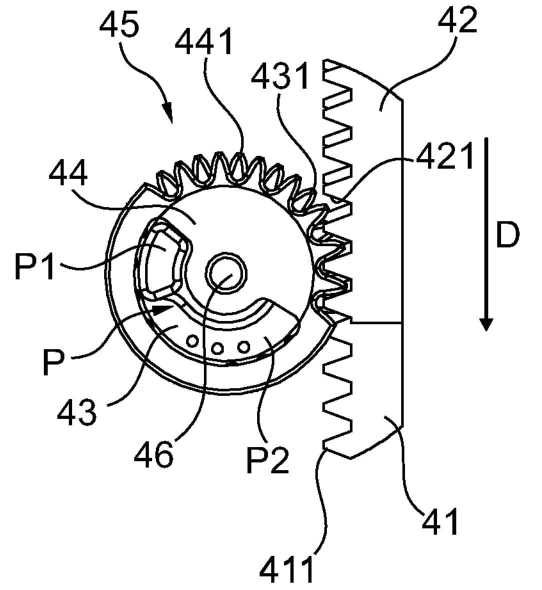

FIG. 6*a* discloses an exploded view of a third embodiment of the invention;

FIG. 6*b* discloses an exploded view of a coupler, rod arrangement and follower arrangement of the third embodiment;

FIG. 7*a* discloses a planar view of a fourth embodiment of the invention with a catch and with the play provided in a rotary connection in the rod arrangement;

FIG. 7*b* discloses an enlarged view of the circle of FIG. 7*a;*

Figure 7C:
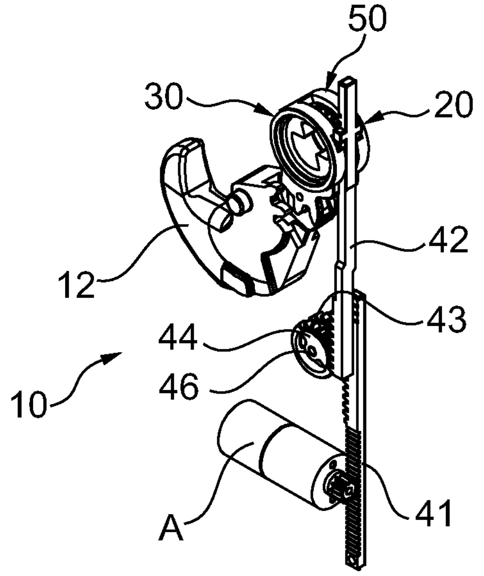
Figure 8B:
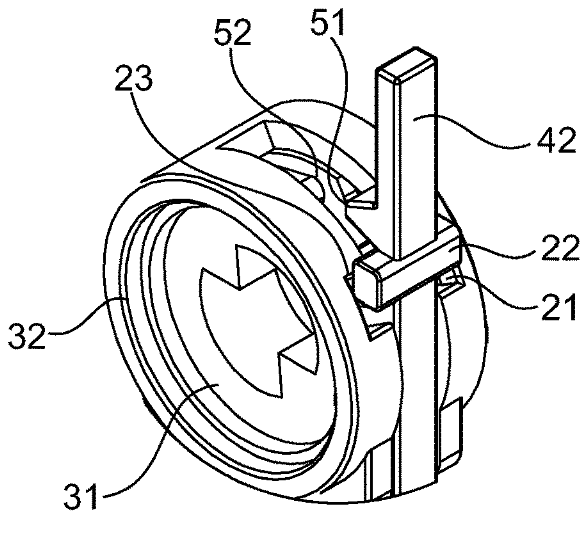
Figure 8A:
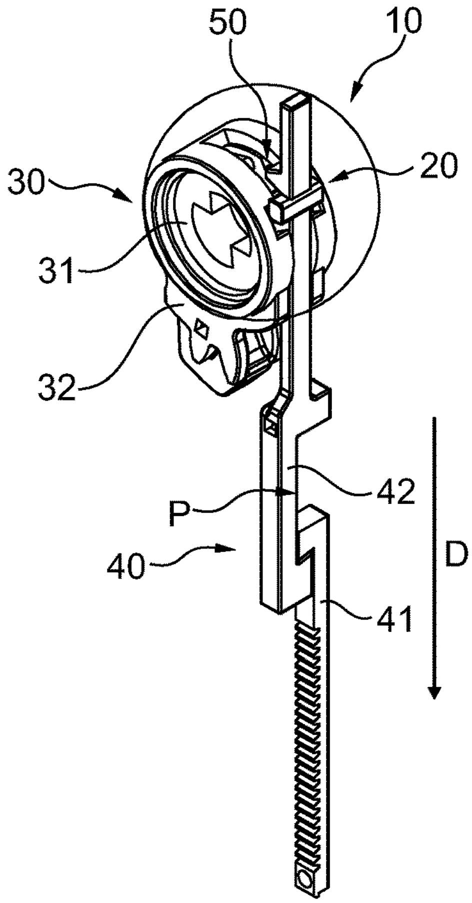

FIG. 7*c* discloses a perspective view of the fourth embodiment;

FIG. 8*a* discloses a perspective view of a fifth embodiment of the invention in the rest position with a catch;

FIG. 8*b* discloses an enlarged view of the circle in FIG. 8*a;*

Figure 8D:
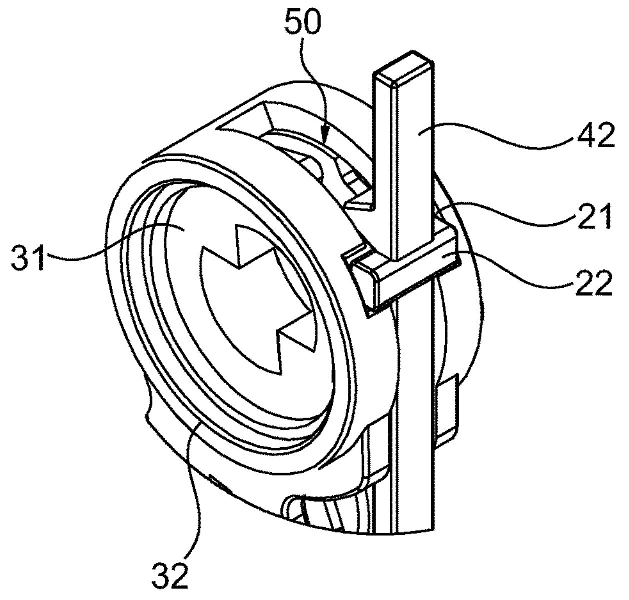
Figure 8C:
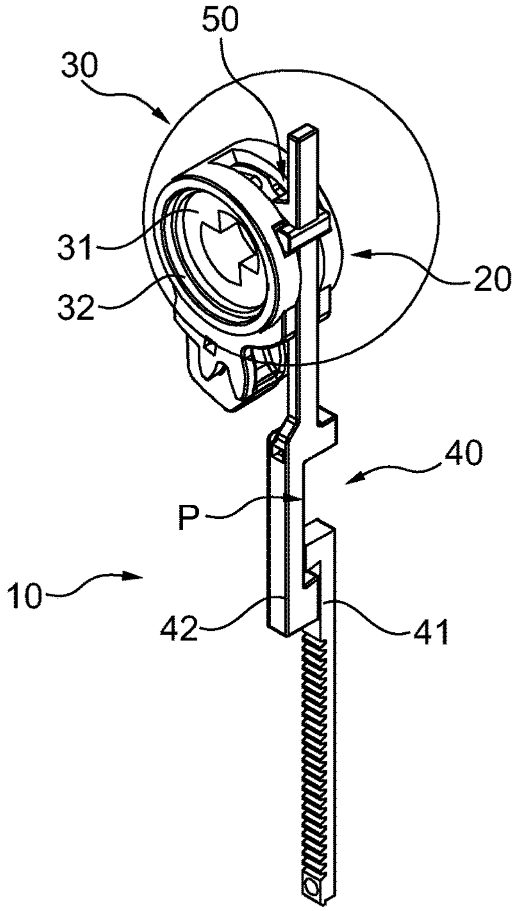

FIG. 8*c* discloses a perspective view of the fifth embodiment in an activated position;

FIG. 8*d* discloses an enlarged view of the circle of FIG. 8*c;*

Figure 8F:
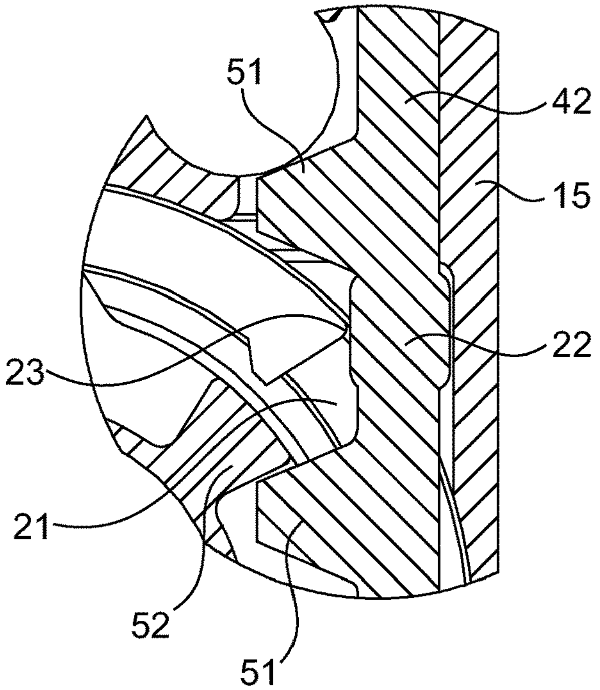
Figure 8E:
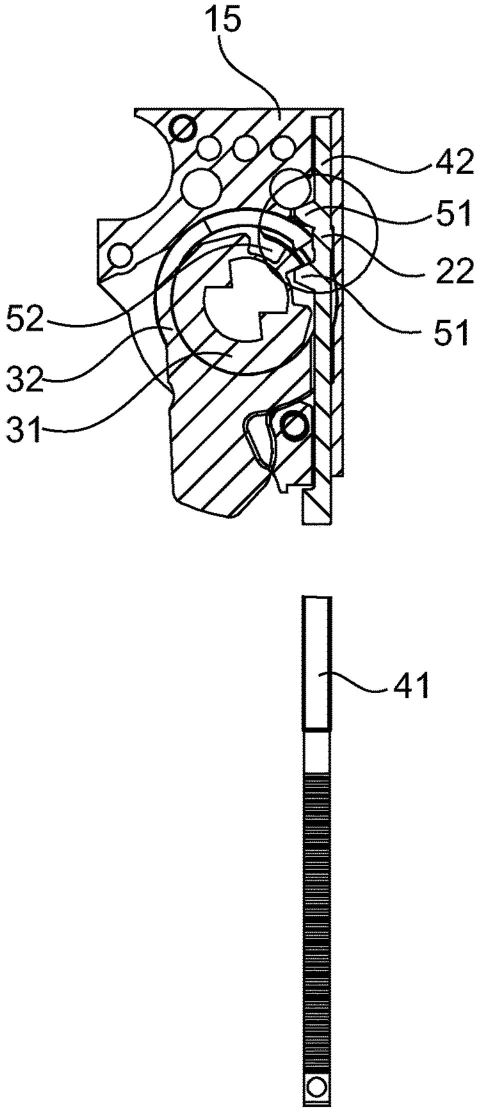

FIG. 8*e* discloses the fifth embodiment of FIG. 8*a* in a cross-sectional view;

FIG. 8*f* discloses an enlarged view of the circle of FIG. 8*e;*

Figure 9A:
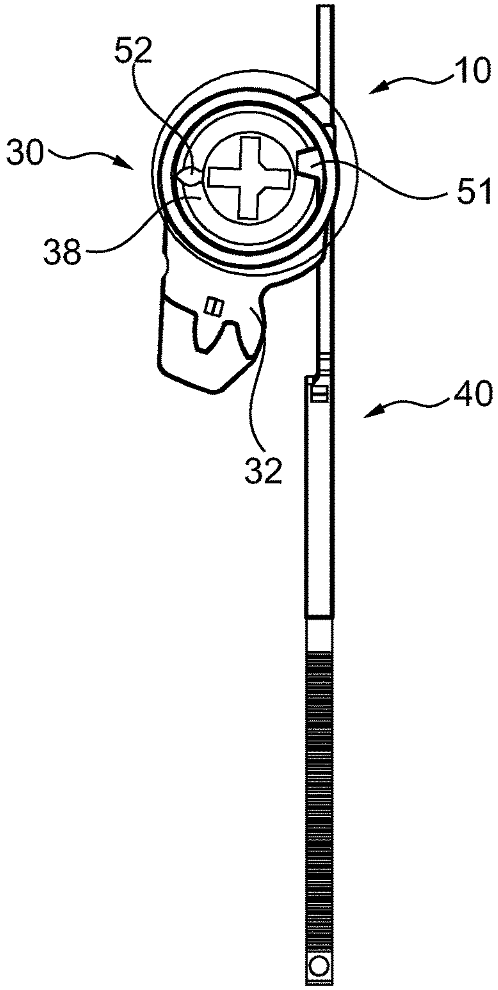
Figure 9B:
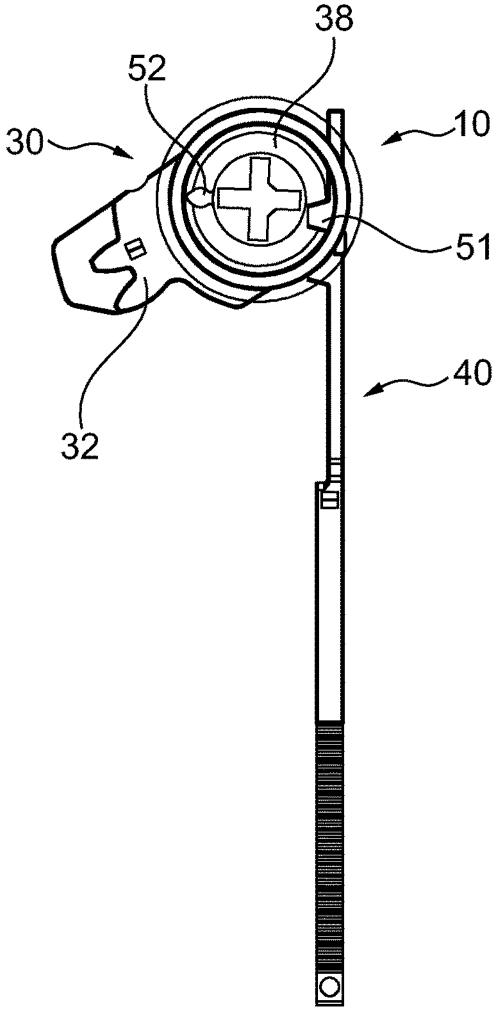
Figure 9C:
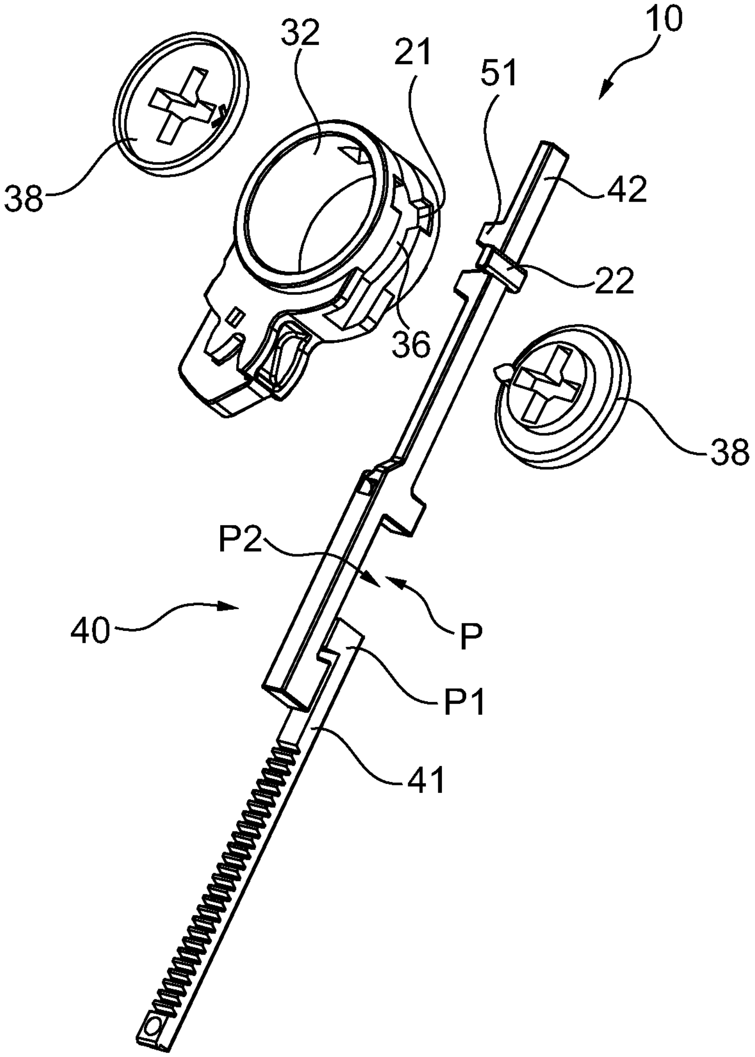

FIG. 9*a* discloses a planar view of a sixth embodiment of the invention in the rest position;

FIG. 9*b* discloses a planar view of the sixth embodiment in an activated position; and FIG. 9*c* discloses an exploded view of the sixth embodiment.

All the figures are schematic, not necessarily to scale, and generally only show parts which are necessary to elucidate the respective embodiments, whereas other parts may be omitted or merely suggested. Any reference number appearing in multiple drawings refers to the same object or feature throughout the drawings, unless otherwise indicated.

DETAILED DESCRIPTION

In the following, main features of the invention will be described with reference to FIG. 1 and more detailed embodiments will then be described with reference to FIG. 2*a* onwards. It is to be noted that any feature from one embodiment may be incorporated into another embodiment as long as such a combination is not expressly stated as unsuitable.

When the term "operatively connected" is used herein, this is to be understood as one component being able to transfer a motion to another component. Such transfer may take place directly by one component contacting the other component or it may alternatively take place by one or more intermediary components that are linked to each other so that the movement of the first component is transferred to the second. As an example, a follower arm of the present invention as described below may be operatively connected to a locking bolt by the follower arm comprising a bolt contacting part that is brought into contact with the locking bolt as the follower arm moves in order to cause a corresponding movement of the locking bolt. Alternatively, the follower arm may contact an intermediary component that is moved directly by the follower arm and that in turn contacts the locking bolt and transfers the movement to the locking bolt. In some embodiments, the intermediary component may be a plurality of components that are able to act one on the other so that a movement of a first of the plurality of components is transferred.

The main benefit of the present invention is that a very compact and robust locking device is provided that enables retraction of a locking bolt both by mechanical activation and by non-mechanical activation (e.g. electrical, electronical or magnetic activation) and that movements in the locking device caused by the mechanical activation are not transmitted to a non-mechanical activation unit. This significantly increases a lifetime of the non-mechanical activation unit. It is especially advantageous that the locking device comprises very few components and that the configuration of a rod arrangement and a follower arrangement for operating the locking bolt may be realized in such a space efficient way that the locking device may be a narrow profile lock. This enables creation of a narrow profile lock that is able to contain all these functions while at the same time not exceeding the maximum available space in a housing for such locking devices. However, it is to be noted that the present invention is in no way limited to narrow profile locks, but rather that the invention is suitable for use in different kinds of locks.

Main variations of the invention concern how the follower arrangement and the rod arrangement cooperate in allowing the rod arrangement to control the follower arrangement but at the same time preventing movement initiated in the follower arrangement from being transferred by the rod arrangement to the non-mechanical activation unit. Also, the invention may comprise a catch that is able to lock the follower arrangement such that movement of the follower arm is not possible. Other variations of the invention include the locking device having a follower that is configured to rotate 90° for operating the locking bolt and the locking bolt having a follower that is instead configured to rotate 360° for operating the locking bolt with the locking device being a split spindle lock.

Thus, FIG. 1 discloses a locking device 10 according to the invention having a locking bolt 12 that is pivotable on a bolt pivot 13 and that is able to interact with a follower arrangement 30 by a follower engagement part 14 being provided as is well known within the art. Thus, the follower arrangement 30 is operatively connected to the locking bolt 12, and in the embodiment shown in FIG. 1 this connection is achieved by a follower arm 32 (see below) being configured to contact the locking bolt 12. In other embodiments, the follower arm 32 may instead be connected to the locking bolt 12 through at least one intermediary component.

In FIG. 1 and indeed in most other Figures provided herein the locking bolt 12 is shown to be pivotable, but it is especially to be noted that the locking bolt 12 could also be a bolt that is able to perform a linear motion such as a dead bolt or a latch bolt. Only minor modifications to the locking device 10 would be needed to adapt it to interacting with a linearly movable locking bolt 12 and this will not be described in detail herein; suffice it to say that it is well known within the field of locking devices that locking bolts may be pivotable or linear and that locking devices are easily modified to be used with one or the other.

The locking device 10 is fitted in a housing 11 that typically is of standard dimensions for the intended placement of the locking device 10 in a door. For narrow profile locks in particular, the backset of the housing 11 is generally about 35 mm or even as small as 28 mm. The locking device may also comprise an inner housing 15 for enclosing the follower arrangement 30 and suitably also at least a part of the rod arrangement 40 in order to protect the locking device 10 from external manipulation.

The locking bolt 12 has an extended position shown in FIG. 1 that corresponds to a locked state, i.e. a state where the locking bolt 12 protrudes into a receiving portion in a door frame so that opening of a door that is equipped with the locking device 10 is prevented. The locking bolt 12 also has a retracted position corresponding to an unlocked state in which it is retracted into the housing 11 so that the door may move in relation to the door frame.

The locking device 10 of FIG. 1 comprises a follower 31 for mechanical activation and the follower arrangement 30 is configured to transfer a rotation of the follower 31 that occurs in response to a mechanical activation in the form of manual insertion and rotation of a key to the locking bolt 12. This will be described in more detail further below. The locking device 10 also comprises a non-mechanical activation unit A that is operatively connected to a bolt arrangement 40 that is in turn configured to transfer a movement to the follower arrangement 30 as will also be described further below.

The activation of the follower 31 is suitably a mechanical activation in which a user inserts an object such as a key into a receiving component that is typically a cylinder (not shown). Said cylinder is mounted in connection with the follower 31 and typically comprises a protrusion that extends into an opening of the follower 31 such that the cylinder and the follower 31 rotate together. Such mechanical activation and variations thereof are well known within the art and are therefore not described in more detail herein.

The non-mechanical activation unit A may typically be an electrical motor, a solenoid or another type of non-mechanical unit such as an electronic device that may be a micro switch or other actuator that is able to cause an activation in a locking device. In FIG. 1, the non-mechanical activation unit A is shown in the form of an electrical motor that is connected to the rod arrangement 40 by rotation of rotating portion 91 that is coupled to a first rod 41 by a gear rack 411 of the first rod 41 interacting with corresponding gears on the rotating portion 91. This causes a linear movement of the first rod 41 in response to activation of the non-mechanical activation unit A. Other kinds of connection between a non-mechanical activation unit and a rod are also known in the art and would be suitable for use with the invention as long as a movement caused by the non-mechanical activation unit is transferred to the rod.

The locking device 10 also comprises a coupler (see FIG. 2*a* onwards below) that is configured to couple the linear movement of the first rod 41 to the follower arrangement 30 to enable the non-mechanical activation unit A to operate the locking bolt 12.

Also comprised in the locking device 10 is a play P that prevents the movement of the follower 31 when activated by mechanical means from being coupled to the first rod 41. This protects the non-mechanical activation unit A so that forced rotation of the rotating portion 91 is prevented. The play P is formed by a clearance in the locking device so that a component connected to the follower arm is able to move without that movement being transferred to the first rod or a component connected to the first rod. In the embodiments described herein, the play P is provided in the rod arrangement 40 or in the coupler 50 and comprises a play protrusion extending into a play gap. Since the play gap is larger than the play protrusion, a part of the locking device that comprises the play protrusion and another part of the locking device that comprises the play gap are able to move in relation to each other without that movement being transferred from one to the other. For the locking device 10 of the present invention, one of the play protrusion and the play gap is arranged on a part that is connected to the follower arrangement 30 and the other of the play protrusion and the play gap is arranged on the first rod 41 or a part that is connected to the first rod 41. A part being connected to another is to be understood as the parts being arranged in such a way that a movement of one of them is transferred to the other.

FIG. 2 discloses the inner housing 15 holding the follower arrangement 30 and a part of the rod arrangement 40 of a first embodiment of the invention. By the inner housing 15 preventing access to the interaction of the rod arrangement 40 with the follower arrangement 30, external manipulation of the locking device is efficiently prevented. The rod arrangement 40 of the first embodiment comprises the play P that is arranged between the first rod 41 and a second rod 42.

FIG. 3*a* discloses an exploded view of the first embodiment, with the inner housing 15 shown as a first housing part 151 and a second housing part 152 and the follower arrangement 30 with the follower 31 and a follower arm 32 that comprises a bolt engagement part 33. The follower 31 and the follower arm 32 are arranged to rotate about a first axis B (see FIG. 3*b*) and the follower is configured to operate the follower arm 32, in this first embodiment by a first engaging portion 34 of the follower 31 and a second engaging portion 35 of the follower arm 32 interacting with each other. In FIG. 3*c*, the first engaging portion 34 is in the form of a follower protrusion 34 contacting a wall of a follower recess 35 (see FIG. 3*c*) that forms the second engaging portion 35 in order for the rotation of the follower 31 to be transferred to the follower arm 32. In other embodiments, the first engaging portion 34 and the second engaging portion 35 could be any other mechanical connection that is suitable for transferring a rotation.

In embodiments where a pivoting locking bolt 12 is used, it may be especially beneficial for the bolt engagement part 33 to be configured to contact the follower engagement part 14 directly since this allows for a compact design with few components and with an efficient transfer of force from the follower arm 32 to the locking bolt 12. However, in embodiments where a dead bolt or latch bolt is used it may instead be advantageous to provide one or more intermediary components to aid in transferring the rotary motion of the follower arm 32 into a linear motion for the locking bolt 12 since this increases efficiency of operation of the locking device 10 where a linear movement of the locking bolt 12 is desired.

The follower arrangement 40 comprises the first rod 41 and the second rod 42, and the second rod 42 comprises a first coupling portion 51 that forms a coupler 50 together with a matching second coupling portion 52 on the follower 31. The first coupling portion 51 is configured to mate with the second coupling portion 52 in order for a movement of the second rod 42 to be coupled to the follower 31 and vice versa. In this way, the linear movement of the second rod 42 is transferred to a rotating movement of the follower 31 and by the follower 31 engaging with the follower arm 32 it allows the non-mechanical activation unit A to operate the locking bolt 12.

In this first embodiment the second rod 42 and the follower 31 are configured to move together so that any rotation of the follower 31 is transferred to the second rod 42 and any linear movement of the second rod 42 is transferred to the follower 31. In order to prevent such movements from being transferred from the second rod 42 to the first rod 41, the play P is provided between the first rod 41 and the second rod 42. The play P is formed by a play protrusion P1 in a mounted state extending into a play gap P2 that has a length d that allows the second rod 42 to move in response to the rotation of the follower 31 without the play protrusion P1 contacting edges of the play gap P2. In the embodiment of FIG. 3*a*-3*c*, the play protrusion P1 is arranged on the first rod 41 and the play gap P2 on the second rod 42 but it is to be noted that the play protrusion P1 and the play gap P2 may be arranged on any part of the rod arrangement 40 as long as the movement of the second rod 42 may be prevented from being transferred to the first rod 41.

The non-mechanical activation unit A is suitably configured to maintain the first rod 41 in a rest position (see below) when not activated by the non-mechanical activation unit A itself, and this rest position suitably corresponds to a position in which a first contact surface C1 of the play protrusion P1 is held sufficiently close to a second contact surface C2 of the play gap P2 for the first contact surface C1 to be able to contact the second contact surface C2 when the first rod 41 is moved in a first direction D. This causes the second rod 42 to move in the first direction D together with the first rod 41, and by means of the coupler 50 this movement is transferred to the follower 31. Simultaneously, the rest position of the first rod 41 suitably is a position in which a third contact surface C3 is at a distance from a fourth contact surface C4 of the play gap P2 so that the second rod 42 is able to move in the first direction D in response to the rotation of the follower 31 without the third contact surface C3 and the fourth contact surface C4 coming into contact with each other. In this way, the play P is configured to transfer a movement in the first direction D from the first rod 41 to the second rod 42 but not from the second rod 42 to the first rod 41.

FIG. 3*b* discloses the first embodiment in a mounted state without the inner housing 15 in order to show the follower arrangement 30 and the rod arrangement 40 more clearly. The follower arm 32 comprises an elongated opening 36 that allows the second rod 42 to contact the follower 31 and that aids in making the rod arrangement 40 and follower arrangement 30 even more compact. FIG. 3*c* shows the mounted state of FIG. 3*b* in a planar view to show the follower protrusion 34 and the follower recess 35. In some embodiments, there may be a play also between the follower 31 and the follower arm 32 through the follower protrusion 34 being smaller than the follower recess 35 so that the follower 31 is able to move a small distance before it is transferred to the follower arm 32.

In the first embodiment, the first rod 41 and the second rod 42 are shown as being arranged to move linearly and this is a suitable and convenient way of achieving a compact and reliable locking device where the movement caused by the non-mechanical activation unit A is transferred to the follower arrangement 30. However, in some embodiments it would be equally suitable for the rod arrangement 40 to move along a curved path rather than a linear path and this would also be possible within the scope of the present invention. Depending on design of the locking device 10 itself and where the non-mechanical activation unit A is suitably placed in relation to the follower arrangement 30, the rod arrangement 40 could be designed to move as suited in order for the movement to be transferred to the follower arrangement 30.

Operation of the invention according to the first embodiment will now be described with reference to FIG. 4*a*-4*f*. It is especially to be noted that what is said here regarding the first embodiment is applicable also to other embodiments of the invention even though the play P may be designed differently and be placed in different parts of the rod arrangement 40 and the coupler 50.

FIG. 4*a*-4*b* discloses a rest position of the rod arrangement 40 where the first rod 41 is in a position where a movement of the first rod 41 in the first direction D would cause the second rod 42 to also perform a corresponding motion in the first direction, whereas the play P acts to allow a movement of the second rod 42 in the first direction D without also causing a corresponding movement of the first rod 41. This rest position is a position where neither mechanical nor non-mechanical activation takes place, and where the locking bolt 12 is in its extended position (see FIG. 1) that corresponds to the locked state.

FIG. 4*c*-4*d* show the rod arrangement 40 and follower arrangement 30 in a mechanically activated position, where mechanical activation of the follower 31 has resulted in a corresponding rotation of the follower arm 32 that in turn causes the locking bolt 12 to be retracted to the retracted position that corresponds to the unlocked or open state. As the follower 31 rotates in a clockwise direction in the Figures, the coupler 50 with the second coupling portion 52 interacts with the first coupling portion 51 of the second rod 42 and causes a movement of the second rod 42 in the first direction D. Due to the play P, the second rod 42 is able to move without the fourth contact surface C4 contacting the third contact surface C3. Thereby, the first rod 41 remains in the rest position of FIG. 4*a*-4*b*.

After mechanical activation, the locking device 10 is returned to the locked state either by a mechanical deactivation in which the follower 31 is rotated in a counterclockwise direction back to the position shown in FIG. 4*a*-4*b* or by a non-mechanical activation by the non-mechanical activation unit A that moves the first rod 41 in a direction opposite to the first direction D. Due to the third contact surface C3 in the mechanically activated position of FIG. 4*c*-4*d* being close to the fourth contact surface C4, this would also cause the second rod 42 to move in the direction opposite to the first direction D so that the follower 31 and thereby also the follower arm 32 is rotated to retract the locking bolt 12. After non-mechanical activation is completed, the first rod 41 is suitably returned to the rest position of FIG. 4*a*-4*b*.

FIG. 4*e*-4*f* show the rod arrangement 40 and follower arrangement 30 in a non-mechanically activated position, where non-mechanical activation of the activation unit A has caused the first rod 41 to move in the first direction D. By the first contact surface C1 of the play protrusion P1 being close to the second contact surface C2 of the play gap P2, the movement of the first rod 41 causes a corresponding movement of the second rod 42, thereby causing the linear movement of the rod arrangement 40 to be coupled to the follower 31 by means of the coupler 50 so that the follower arm 32 is rotated and causes the locking bolt 12 to move to the retracted position.

In order to return the locking bolt 12 to its retracted position, a non-mechanical activation of the non-mechanical deactivation unit A may cause the first rod 41 to move to the rest position and to move beyond it in the direction opposite to the first direction D in order to contact the second rod 42. By thus pushing on the second rod 42, the follower 31 and thereby also the follower arm 32 is pivoted back to the position corresponding to the extended position of the locking bolt 12. Alternatively, a mechanical activation of the follower 31 may rotate the follower 31 and thereby also the follower arm 32 in order to pivot the follower arrangement 30 back to the position corresponding to the extended position of the locking bolt 12.

It is especially beneficial that both retracting and extending the locking bolt 12 may be achieved through either the mechanical or the non-mechanical activation or a combination where a mechanical activation moves the locking bolt 12 to one state and a non-mechanical activation returns the locking bolt 12 to the other state, or vice versa. Suitably, each mechanical activation or deactivation is followed by a return of the first rod 41 to the rest position.

An activation of the non-mechanical activation unit A as disclosed herein is to be understood as an action that results in the first rod 41 moving from the rest position in either the first direction D or the direction opposite to the first direction D. A mechanical activation, on the other hand, is to be understood as any rotation of the follower 31 that results from a turning of a mechanical activation device such as a key in a receiving cylinder or similar connected to the follower arrangement 30.

FIG. 5*a* discloses a second embodiment that differs from the first embodiment by the follower and the follower arm of the follower arrangement 30 being joined together to form a single component that may be referred to as an integrated follower arm 37. The integrated follower arm 37 is configured to perform the functions of the follower 31 described above as well as the functions of the follower arm 32, but instead of two separate components a single component is provided instead. This is advantageous in providing a more robust follower arrangement 30.

FIG. 5*b* discloses the second embodiment in a mounted state, where the integrated follower arm 37 and the rod arrangement 40 are assembled, and FIG. 5*c* discloses the coupler 50 of the third embodiment in more detail. The integrated follower arm 37 in this embodiment comprises the second coupling portion 52 whereas the second rod 42 of the rod arrangement 40 comprises the first coupling portion 51 as in the first embodiment.

The first and second interaction portions 51, 52 are shown as gears or toothed sections that are able to mesh in order to transfer a linear movement into a rotational movement or vice versa. It is to be noted however that the first and second interaction portions 51, 52 may alternatively be any other suitable means for transferring such motion, as will be discussed with reference to an embodiment of FIG. 8 disclosed below.

FIG. 6*a* discloses a third embodiment of the locking device 10 with the first housing part 151 and the second housing part 152 provided to encase the follower arrangement 30 and part of the rod arrangement 40 similar to the first and second embodiments. The third embodiment is also similar to the second embodiment in providing the follower arrangement 30 in the form of the integrated follower arm 37.

However, the third embodiment differs in providing the play P in the coupler 50 rather than in the rod arrangement 40. The rod arrangement 40 may therefore comprise only the first rod 41 that is configured to interact with the non-mechanical activation unit A as previously described, but that here also comprises the first coupling portion 51 of the coupler 50. Thus, a movement of the first rod 41 is coupled directly to a coupling member 53 that is arranged to pivot around the first axis B. The coupling member 53 comprises the second coupling portion 52 and also comprises a follower arrangement engagement portion in the form of one of the play protrusion P1 and the play gap P2 that is arranged in a connection to the integrated follower arm 37. In FIG. 6*a*-6*b* the play protrusion P1 is shown on the coupling member 53 and the play gap P2 is shown on the integrated follower arm 37, but it would be equally possible to provide the play protrusion P1 on the integrated follower arm 37 and the play gap P2 on the coupling member 53 to form the follower arrangement engagement portion.

FIG. 6*b* shows the coupling member 53 together with the integrated follower arm 37 and the first rod 41 of the rod arrangement 40, disclosing more clearly the play protrusion P1 and the play gap P2 into which it fits in the mounted state. Similar to the play P disclosed in earlier embodiments, the play protrusion P1 fits into the play gap P2 so that a movement of the first rod 41 in the first direction D is coupled to the coupling member 53 and causes the play protrusion P1 to contact an edge of the play gap P2 in order to transfer the rotation of the coupling member 53 to the integrated follower arm 37 and cause the rotation that controls operation of the locking bolt 12. At the same time, the play gap P2 and the play protrusion P1 are arranged such in relation to each other that a rotation of the integrated follower arm 37 caused by a mechanical activation does not cause the rotation to be coupled to the coupling member 53. The interaction of the play protrusion P1 with the play gap P2 is the same as has been described above with reference to FIG. 4*a*-4*f*.

FIG. 7*a*-7*c* disclose a fourth embodiment of the invention that differs from the previously described embodiments by the play P being provided in a rotary connection in the rod arrangement 40. Also, the fourth embodiment comprises a catch arrangement 20 that enables a blocking of the locking device 10 such that movement of the locking bolt 12 is prevented while a catch 22 is in place.

The follower arrangement 30 of the fourth embodiment comprises the follower 31 and follower arm 32 as in the first, second and third embodiments, and the rod arrangement 40 comprises the first rod 41 and the second rod 42 as also shown previously in these embodiments. Also, the coupler 50 is realized as the first coupling portion 51 on the second rod 42 and the second coupling portion 52 on the follower 31 as described above.

The fourth embodiment comprises the play P in a rod coupler 45 that couples the first rod 41 to the second rod 42 in the rod arrangement 40. In the rotary connection, a first rotary member 43 and a second rotary member 44 are arranged on a common pivot 46. One of the first rotary member 43 and second rotary member 44 comprises the play protrusion P1 that in the mounted state fits into the play gap P2 provided on the other of the first rotary member 43 and second rotary member 44. Also, the first rotary member 43 is connected to the first rod 41 by a coupling portion 431 engaging a coupling portion 411 on the first rod 41 such that a linear movement of the first rod 41 is coupled to the first rotary member 43 and vice versa. Furthermore, the second rotary member 44 is connected to the second rod 42 by a coupling portion 441 of the second wheel 4 engaging a coupling portion 421 of the second rod 42 such that a movement of the second rod 42 is coupled to the second rotary member 44, and vice versa. By the play P being provided between the first rotary member 43 and the second rotary member 44, a rotation of the first rotary member 43 that results from a movement of the first rod 41 in the first direction D is coupled to the second rotary member 44 so that the second rod 42 also moves in the first direction D and causes the rotation of the follower arm 32 as described above. However, a movement of the second rod 42 in the first direction D that results from a rotation of the follower 31 causes by the mechanical activation is not coupled from the second rotary member 44 to the first rotary member 43 due to the play protrusion P1 not being in contact with an edge of the play gap P2. In this way, the first rod 41 is not affected by the mechanical activation of the locking device 10.

FIG. 7*c* discloses the fourth embodiment in the mounted state, showing the locking device 10 from an angle that more clearly shows the arrangement of the first rod 41, first rotary member 43, second rod 42, and second rotary member 44. The first rod 41 and the second rod 42 are in this embodiment arranged side by side with an overlap so that they are able to interact with the first rotary member 43 and second rotary member 44, respectively. Also shown is the catch arrangement 20 that will be described in more detail below.

FIG. 8*a*-8*f* disclose a fifth embodiment of the invention that differs from the embodiments described above by the design of the first and second coupling portions 51, 52 of the coupler 50, and also by the locking device 10 comprising a catch arrangement 20 similar to the fourth embodiment.

In FIG. 8*a*-8*b*, the follower arrangement 30 comprises the follower 31 and follower arm 32 as previously described. The rod arrangement 40 comprises the first rod 41 and second rod 42 and has the play P shown in the first embodiment. The coupler 50 has a first coupling portion 51 on the second rod 42 and a second coupling portion 52 on the follower 31, but also provided is the catch arrangement 20 with a catch receiver 21 that is configured to receive a catch 22. In the fifth embodiment, the catch 22 is shown on the second rod 42 of the rod arrangement 40 and the catch receiver 21 is shown on the follower arm 32, but it is to be noted that the opposite arrangement would also be possible, i.e. with the catch 22 on the follower arm 32 and the catch receiver 21 on the rod arrangement 40.

In the rest position shown in FIG. 8*a*-8*b*, the locking device 10 is in an end position where the second rod 42 is positioned as far as possible in the direction opposite to the first direction D. This is suitably a blocking position where the catch 22 is partly outside the catch receiver 21 so that rotation of the follower arm 32 is prevented by the follower arm 32 being unable to rotate past the catch 22. FIG. 8*e*-8*f* disclose this position in a cross-section so that interaction of the catch 22 with an edge 23 of the catch receiver 21 can be seen. When the catch 22 is in the blocking position, rotation of the follower arm 32 is efficiently prevented by the edge 23 of the catch receiver 21 being prevented from passing the catch 22.

In order to move the follower arm 32, either the mechanical or the non-mechanical activation of the locking device 10 is necessary. In the mechanical activation, the rotation of the follower 31 causes the second coupling portion 52 to engage with the first coupling portion 51 and this causes the linear movement of the second rod 42 that pulls the catch 22 into the catch receiver 21 so that a position shown in FIG. 8*c*-8*d* can be reached. In this position, interaction of the catch 22 and the catch receiver 21 causes the rotation of the follower arm 32 by the catch 22 driving the follower arm 32 so that the locking bolt 12 may be brought into the retracted position. When a non-mechanical activation occurs, the first rod 41 instead pulls the second rod 42 in the first direction D, also causing the movement of the catch 22 into the catch receiver 21 so that the rotation of the follower arm 32 may take place.

The first coupling portion 51 and second coupling portion 52 are in this embodiment in the form of two protrusions and two recesses, respectively, and this is one possible variation on the meshing gears shown e.g. in the first embodiment.

One especially advantageous feature of the fifth embodiment is that the second rod 42 in the mechanical activation is operated by the follower 31 interacting with the coupler 50, and that the catch 22 only blocks the follower arm 32 in the end position, suitably in both an upper end position shown in FIG. 8*a* and a lower end position when the second rod 42 has moved as far as possible in the first direction D. Thereby, the follower arm can be blocked in both the extended position and the retracted position of the locking bolt 12.

FIG. 9*a*-9*b* disclose a sixth embodiment that differs from the embodiments described above by the follower arrangement 30 comprising a 360 follower 38 that is configured to be rotated 360° in response to the mechanical activation. Suitably, the 360 follower 38 is provided as a split spindle with one follower portion 38 on a first side of the locking device 10 and a similar or identical second follower portion 38 on a second side of the locking device 10. Each of the 360 followers 38 suitably comprises the second coupling portion 52 that may be in the form of a single protrusion as shown in FIG. 9*a*-92. In FIG. 9*a*, the locking device 10 is in the rest position, and in FIG. 9*b* the locking device 10 is instead in the activated position where the follower arm 32 is rotated. The rotation of the follower arm is suitably caused by the 360 follower 38 being rotated a full revolution so that the second coupling portion 52 contacts the first coupling portion 51 and causes a movement in the first direction D of the second rod 42, whereupon the second rod 42 in turn causes the movement of the follower arm 32. Alternatively, the 360 follower may be arranged to operate the follower arm 32 that in turn operates the second rod 42, or the 360 follower may be arranged to operate both the follower arm 32 and the second rod 42.

FIG. 9*c* discloses the seventh embodiment in an exploded view, showing the 380 followers 38 together with the follower arm 32 and the rod arrangement 40.

It is to be noted that features from the various embodiments described herein may freely be combined, unless it is explicitly stated that such a combination would be unsuitable. In particular, the play shown in one embodiment may also be used in another embodiment, and the catch used in some embodiments may also be incorporated in other embodiments.

The invention claimed is:

1. Locking device for mechanical and non-mechanical activation of a locking bolt, the locking device (10) comprising a locking bolt (12) having an extended position corresponding to a locked state and a retracted position corresponding to an unlocked state, a follower arrangement (30) comprising a follower arm (32) arranged to rotate about a first axis (B), the follower arm (32) being operatively connected to the locking bolt (12) for moving the locking bolt (12) in response to rotation of the follower arm (32), the follower arrangement (30) comprising a follower (31) configured to rotate about the first axis (B) in response to mechanical activation of the locking device (10), the follower (31) operatively connected to the follower arm (32) such that rotation of the follower (31) causes rotation of the follower arm (32), and a non-mechanical activation unit (A) connected to a rod arrangement (40), said rod arrangement (40) configured to move in a first direction (D) in response to activation of the non-mechanical activation unit (A), said non-mechanical activation unit (A) connected to a first rod (41) of the rod arrangement (40) such that activation of the non-mechanical activation unit (A) causes movement of the first rod (41), wherein the locking device (10) comprises a coupler (50) for coupling movement of the rod arrangement (40) in the first direction (D) to the follower arrangement (30) and causing rotation of the follower arm (32), and a play (P) configured to allow rotation of the follower arm (32) caused by mechanical activation without causing movement of the first rod (41) of the rod arrangement (40).

2. Locking device according to claim 1, wherein the coupler (50) comprises a second coupling portion (52) on the follower arrangement (30) and a first coupling portion (51) on the rod arrangement (40), said first coupling portion (51) configured to engage the second coupling portion (52) such that movement of one of the rod arrangement (40) and the follower arrangement (30) is coupled to the other.

3. Locking device according to claim 1, wherein the play (P) is provided in the coupler (50) such that movement of the rod arrangement (40) in response to the non-mechanical activation is coupled to cause rotation of the follower arm (32), and rotation of the follower arm (32) in response to the mechanical activation is not coupled to the rod arrangement (40).

4. Locking device for mechanical and non-mechanical activation of a locking bolt, the locking device (10) comprising a locking bolt (12) having an extended position corresponding to a locked state and a retracted position corresponding to an unlocked state, a follower arrangement (30) comprising a follower arm (32) arranged to rotate about a first axis (B), the follower arm (32) being operatively connected to the locking bolt (12) for moving the locking bolt (12) in response to rotation of the follower arm (32), the follower arrangement (30) further comprising a follower (31) configured to rotate about the first axis (B) in response to mechanical activation of the locking device (10), the follower (31) operatively connected to the follower arm (32) such that rotation of the follower (31) causes rotation of the follower arm (32), and a non-mechanical activation unit (A) connected to a rod arrangement (40), said rod arrangement (40) configured to move in a first direction (D) in response to activation of the non-mechanical activation unit (A), said non-mechanical activation unit (A) connected to a first rod (41) of the rod arrangement (40) such that activation of the non-mechanical activation unit (A) causes movement of the first rod (41), wherein the locking device (10) comprises a coupler (50) for coupling the movement of the rod arrangement (40) in the first direction (D) to the follower arrangement (30) and causing rotation of the follower arm (32), and a play (P) configured to allow rotation of the follower arm (32) caused by mechanical activation without causing movement of the first rod (41) of the rod arrangement (40), wherein the play (P) is provided in the coupler (50) such that movement of the rod arrangement (40) in response to the non-mechanical activation is coupled to cause rotation of the follower arm (32), and rotation of the follower arm (32) in response to the mechanical activation is not coupled to the rod arrangement (40), wherein the coupler (50) comprises a coupling member (53) arranged to rotate about the first axis (B), said coupling member (53) having a second coupling portion (52) for engaging the rod arrangement (40) such se that movement of the rod arrangement (40) in the first direction (D) is coupled to the coupling member (53), and said coupling member (53) also having a follower arrangement engagement portion (P1) for engaging the follower arrangement (30) and coupling rotation of the coupling member (53) to the follower arrangement (30).

5. Locking device according to claim 4, wherein the play (P) is provided in connection with the follower arrangement engagement portion (P1) such that the follower (31) of the follower arrangement (30) is able to rotate in response to the mechanical activation without causing corresponding rotation of the coupling member (53).

6. Locking device according to claim 2, wherein the first rod (41) of the rod arrangement (40) comprises the first coupling portion (51).

7. Locking device for mechanical and non-mechanical activation of a locking bolt, the locking device (10) comprising a locking bolt (12) having an extended position corresponding to a locked state and a retracted position corresponding to an unlocked state, a follower arrangement (30) comprising a follower arm (32) arranged to rotate about a first axis (B), the follower arm (32) being operatively connected to the locking bolt (12) for moving the locking bolt (12) in response to rotation of the follower arm (32), the follower arrangement (30) further comprising a follower (31) configured to rotate about the first axis (B) in response to mechanical activation of the locking device (10), the follower (31) operatively connected to the follower arm (32) such that rotation of the follower (31) causes rotation of the follower arm (32), and a non-mechanical activation unit (A) connected to a rod arrangement (40), said rod arrangement (40) configured to move in a first direction (D) in response to activation of the non-mechanical activation unit (A), said non-mechanical activation unit (A) connected to a first rod (41) of the rod arrangement (40) such that activation of the non-mechanical activation unit (A) causes movement of the first rod (41), wherein the locking device (10) comprises a coupler (50) for coupling the movement of the rod arrangement (40) in the first direction (D) to the follower arrangement (30) and causing rotation of the follower arm (32), and a play (P) configured to allow rotation of the follower arm (32) caused by mechanical activation without causing movement of the first rod (41) of the rod arrangement (40), wherein the play (P) is provided in the rod arrangement (40) such that movement of the first rod (41) in the first direction (D) causes movement of a second rod (42) operatively connected to the follower arrangement (30) by the coupler (50), and movement of the second rod (42) in the first direction (D) in response to mechanical activation does not cause corresponding movement of the first rod (41).

8. Locking device according to claim 7, wherein the rod arrangement (40) comprises a rod coupler (45) having a first rotary member (43) operatively connected to the first rod (41) and configured to rotate in response to movement of the first rod (41), the rod coupler (45) having a second rotary member (44) operatively connected to the second rod (42) and configured to rotate in response to movement of the second rod (42), wherein the first rotary member (43) and the second rotary member (44) are arranged in connection with each other such that rotation of the first rotary member (43) caused by movement of the first rod (41) in the first direction (D) is transferred to the second rotary member (44), and rotation of the second rotary member (44) caused by a movement of the second rod (42) in the first direction (D) is not transferred to the first rotary member (43).

9. Locking device according to claim 1, wherein the follower (31) comprises a first engaging portion (34) and the follower arm (32) comprises a second engaging portion (35) configured such that rotation of the follower (31) causes the first engaging portion (34) to contact the second engaging portion (35) and rotate the follower arm (32).

10. Locking device for mechanical and non-mechanical activation of a locking bolt, the locking device (10) comprising a locking bolt (12) having an extended position corresponding to a locked state and a retracted position corresponding to an unlocked state, a follower arrangement (30) comprising a follower arm (32) arranged to rotate about a first axis (B), the follower arm (32) being operatively connected to the locking bolt (12) for moving the locking bolt (12) in response to rotation of the follower arm (32), the follower arrangement (30) further comprising a follower (31) configured to rotate about the first axis (B) in response to mechanical activation of the locking device (10), the follower (31) operatively connected to the follower arm (32) such that rotation of the follower (31) causes rotation of the follower arm (32), and a non-mechanical activation unit (A) connected to a rod arrangement (40), said rod arrangement (40) configured to move in a first direction (D) in response to activation of the non-mechanical activation unit (A), said non-mechanical activation unit (A) connected to a first rod (41) of the rod arrangement (40) such that activation of the non-mechanical activation unit (A) causes movement of the first rod (41), wherein the locking device (10) comprises a coupler (50) for coupling the movement of the rod arrangement (40) in the first direction (D) to the follower arrangement (30) and causing rotation of the follower arm (32), and a play (P) configured to allow rotation of the follower arm (32) caused by mechanical activation without causing movement of the first rod (41) of the rod arrangement (40), wherein the locking device further comprises a catch (21, 22) for preventing rotation of the follower arm (32), said catch (21, 22) comprising a catch protrusion (22) arranged on one of the rod arrangement (40) and the follower arrangement (30), and the locking device (10) comprising a catch receiver (21) arranged on the other of the rod arrangement (40) and the follower arrangement (30), wherein the catch protrusion (22) is configured to block the catch receiver (21) and prevent movement of the follower arm (32) in relation to the rod arrangement (40).

11. Locking device according to claim 10, wherein the catch protrusion (22) is configured to block the catch receiver (21) when the rod arrangement (40) is in an end position.

12. Locking device according to claim 1, wherein the follower (31) and the follower arm (32) of the follower arrangement (30) are fixedly connected to each other.

13. Locking device according to claim 1, wherein the locking device (10) is a narrow profile lock.

14. Locking device according to claim 2, wherein the play (P) is provided in the coupler (50) such that movement of the rod arrangement (40) in response to the non-mechanical activation is coupled to cause rotation of the follower arm (32), and rotation of the follower arm (32) in response to mechanical activation is not coupled to the rod arrangement (40).

15. Locking device according to claim 14, wherein the coupler (50) comprises a coupling member (53) arranged to rotate about the first axis (B), said coupling member (53) having a second coupling portion (52) for engaging the rod arrangement (40) such that movement of the rod arrangement (40) in the first direction (D) is coupled to the coupling member (53), and said coupling member (53) also having a follower arrangement engagement portion (P1) for engaging the follower arrangement (30) and coupling rotation of the coupling member (53) to the follower arrangement (30).

16. Locking device according to claim 15, wherein the play (P) is provided in connection with the follower arrangement engagement portion (P1) such that the follower (31) of the follower arrangement (30) is able to rotate in response to mechanical activation without causing corresponding rotation of the coupling member (53).

17. Locking device according to claim 16, wherein the first rod (41) of the rod arrangement (40) comprises the first coupling portion (51).

18. Locking device according to claim 15, wherein the first rod (41) of the rod arrangement (40) comprises the first coupling portion (51).

19. Locking device according to claim 14, wherein the first rod (41) of the rod arrangement (40) comprises the first coupling portion (51).

20. Locking device according to claim 5, wherein the first rod (41) of the rod arrangement (40) comprises the first coupling portion (51).

* * * * *